O. A. RICHWINE.
HAY BALER INDICATOR.
APPLICATION FILED FEB. 7, 1913.
1,186,683.
Patented June 13, 1916.
2 SHEETS—SHEET 2.
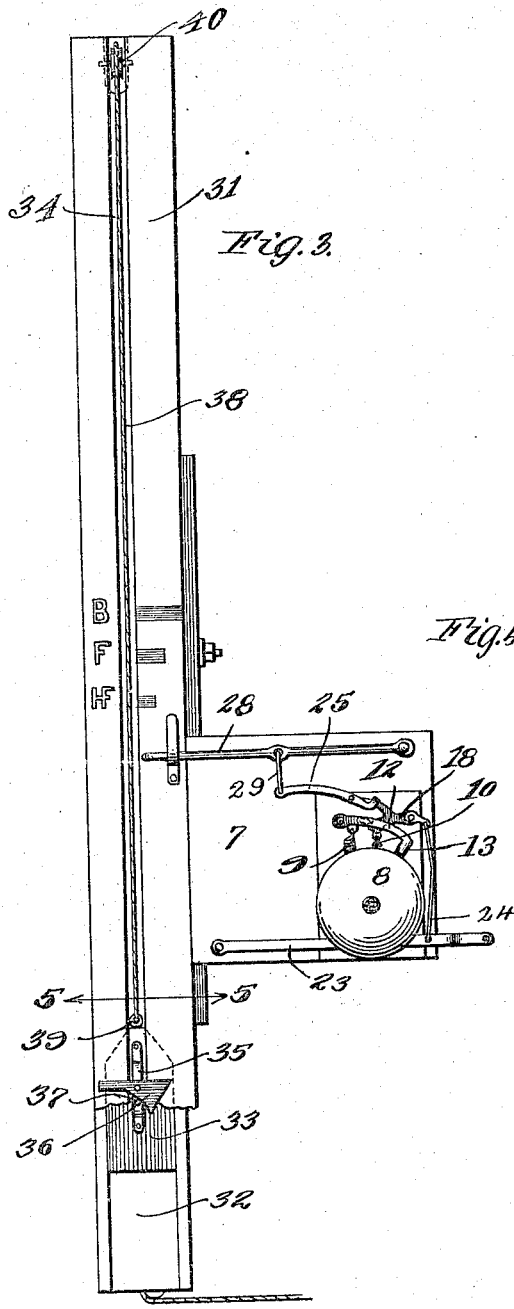
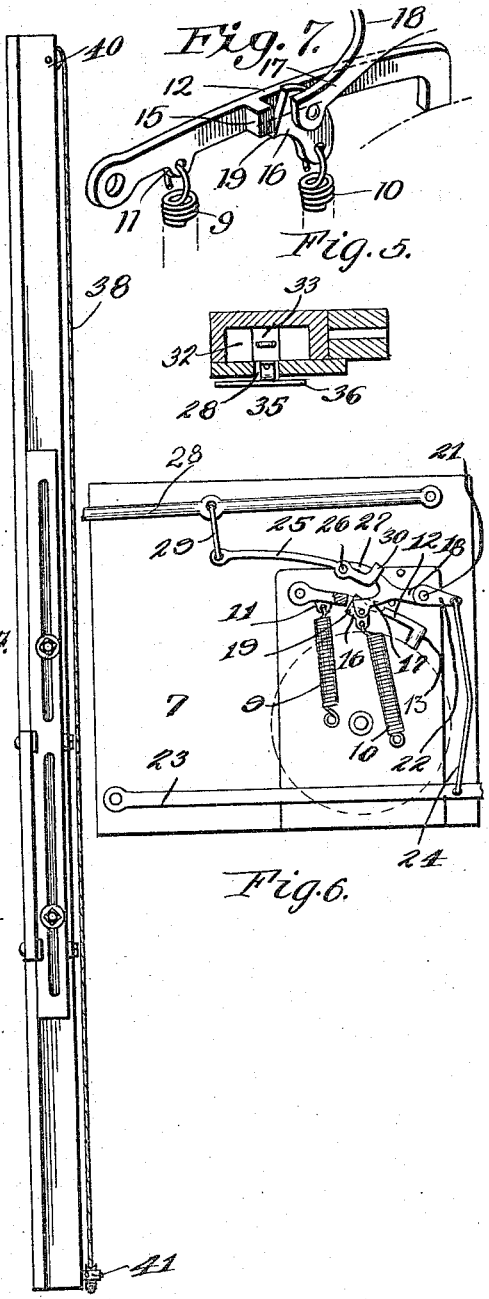
WITNESSES
B. M. Spring.
C. L. Landon.
INVENTOR
Ola A. Richwine,
his Attorney

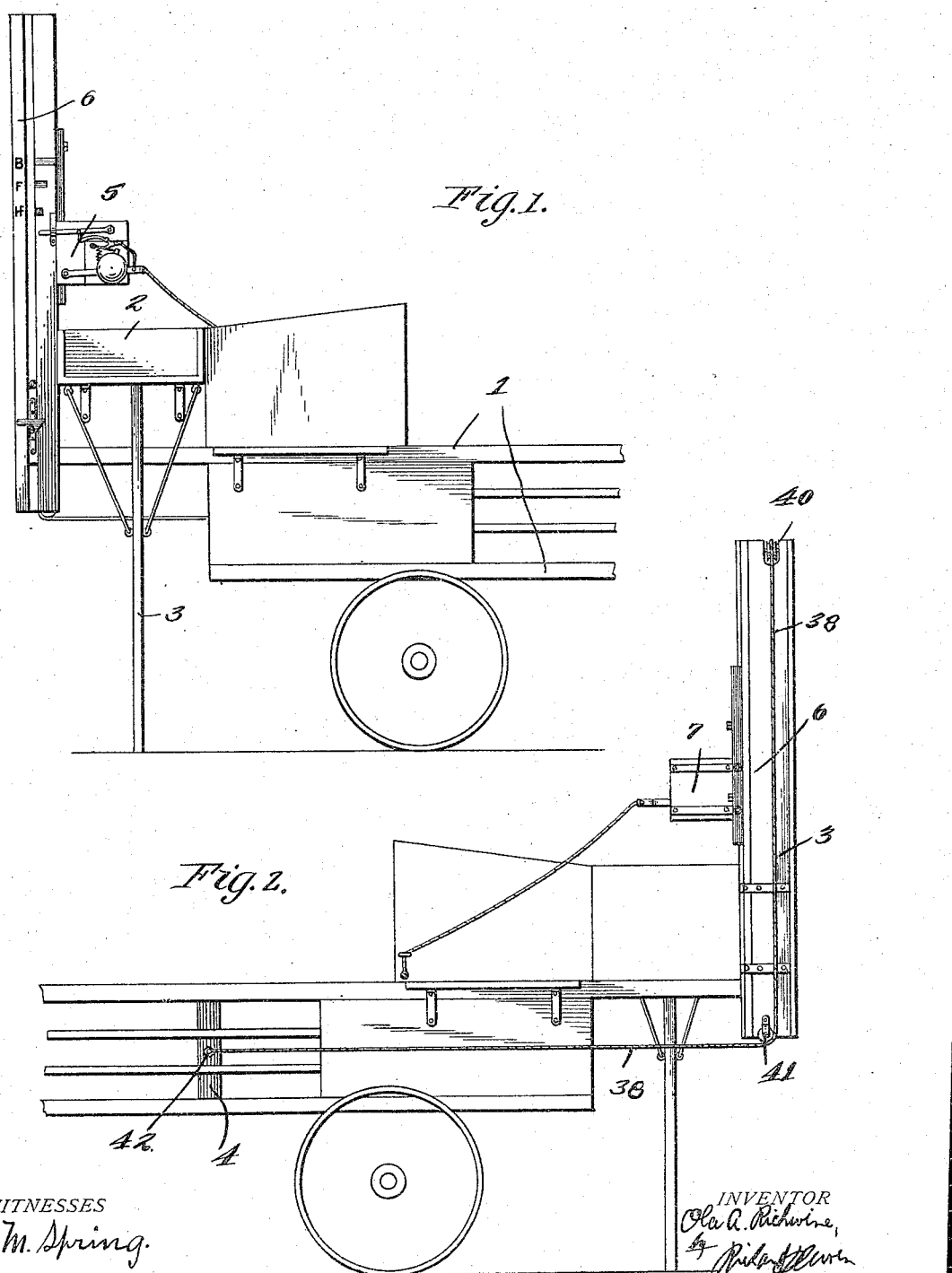

ID="UNITED STATES PATENT OFFICE."

OLA A. RICHWINE, OF PITTSBURG, KANSAS.

HAY-BALER INDICATOR.

1,186,683.  Specification of Letters Patent.  Patented June 13, 1916.

Application filed February 7, 1913. Serial No. 746,892.

*To all whom it may concern:*

Be it known that I, OLA A. RICHWINE, a citizen of the United States, residing at Pittsburg, in the county of Crawford and State of Kansas, have invented certain new and useful Improvements in Hay-Baler Indicators, of which the following is a specification.

This invention relates to an improvement in that class of baling-presses commonly known as "perpetual presses" in which the material to be baled is continually fed into the press and in which the finished bales follow each other uninterruptedly from the discharge opening. In machines of this type, the desideration is the formation of the material into bales of similar sizes. To this end it has been found necessary to station an attendant in the vicinity of the compressing chamber in order that the feed operator for the machine may be notified when the bale has reached the desired size; this modification being necessary in machines of this class by reason of the fact that as each bale is completed the feeding process must be temporarily interrupted to allow the placing of a head board at the rear end of the finished bale before the bale to be subsequently formed is started.

With a view of eliminating the necessity of an attendant for a baling machine, I have designed and evolved my invention in the effort to provide an automatic alarm indicator which may be quickly attached to any baling machine or baling plate and which will automatically notify the feeder of the machine that the bale within the press is nearing completion and which being within clear visual range of the operator will permit him to read on the indicator the exact moment at which to stop the feeding device and insert a head board.

The above and additional objects are accomplished by such means as are illustrated in their preferred embodiment in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which, similar reference numerals designate corresponding parts: Figure 1 is a side elevation of the baling machine taken on the feed side and illustrating the indicator in operative assembled relation to the bale. Fig. 2 is a side elevation taken from the off side of the machine. Fig. 3 is a detail in front elevation of the indicator in disassembled relation to the bale. Fig. 4 is a side elevation of the indicator. Fig. 5 is a section on the line 5—5 of Fig. 3. Fig. 6 is a detail plan view of the annunciator and the actuating mechanism employed. Fig. 7 is a detail view of the trigger engaging member and the trigger coöperating therewith showing the same on an enlarged scale.

Proceeding now to the description of the drawings, I have illustrated my invention as employed in connection with a baling machine, parts of which, essential to the description of my device, are included in the drawings although I do not claim them as part of my invention. In this connection, the numeral 1 indicates the general framework of the compressing chamber, the numeral 2 indicates the feed chute carrying a supporting leg 3. The head board carried within the compressing chamber is designated by the numeral 4.

Coming now to the description of my invention, it may be said to consist of two main elements: the annunciator designated in Fig. 1 as an entirety by the numeral 5 and the actuating means and supporting structure therefor designated in Fig. 1 by the numeral 6.

The annunciator is mounted on the supporting plate 7 which is fixedly attached to the supporting structure as 1 in Fig. 1. A metallic bell 8 is mounted on the plate 7 in spaced relation therefrom to permit the spring members 9 and 10 to be placed between the bell and the plate 7. The spring member 9 is attached at its lower end to the plate 7 and at its upper end is secured to a perforated ear 11 formed integrally with the pivotally mounted striker arm 12, the clapper head 13 of which is normally held against the bell 8 by the retractive force of the spring 9. The striker arm 12 has formed thereon a trigger-engaging member 15. A trigger member 16 is pivotally mounted on the arm 17 of the yoke lever 18 and normally held with the point 19 in engagement with the under portion of the member 15 by means of the retractive coil spring 10. The lever 18 is pivotally secured to the plate 7 intermediate its length as at 21 and has the outer arm 22 operatively connected to the actuating lever 23 by means of the connecting rod 24. The lever 25 is pivotally connected to the yoke arm 27 and is operatively connected to the lever 28 by the link 29. The terminal 30 of the lever 25 is bent upwardly and thence directed toward the plate 7 thus forming a bill member which is adapted to bear against the arm 27.

From the foregoing disclosure it will be seen that when the arm 28 is pulled upwardly the pull will be communicated to the striker arm 12 through the members 25, 18 and 16. The member 16 being pivotally mounted, however, to swing in an opposite direction from that taken by the member 18, it will be apparent that when the member 12 has been drawn upwardly against the tension of the spring 9 to a substantially horizontal position, the point 19 of the member 16 will be disengaged from the member 15 and the arm 12 will be drawn downwardly into its original position.

The construction of the alarm signal being thus disclosed, it now remains to describe the supporting structure and actuating means 6. This structure includes a vertically disposed standard 31, secured to the baling machine in any desired manner and in close proximity to the feeder of the machine. A guideway 32 extends longitudinally of the standards and is provided for the vertical movement of the weight 33. The standard is equipped with a longitudinal slot 34 which communicates with the guide way 32 and is provided to permit the sliding movement of the trigger supporting member 35. This trigger 36 is pivotally secured to the member 35 and is disposed for movement over the front face of the standard. A stop pin 37 is carried by the member 35 and is disposed to prevent the trigger from falling below the position illustrated in Fig. 3. The cable 38 is arranged within the guide way 32 and is secured at one end to an eyelet 39 carried by the weight 33. This cable plays through a pulley 40 mounted adjacent the upper end of the standard and is directed downwardly and thence through the pulley 41 secured to the lower end of the standard and to the rear face thereof and is attached at its forward end to the head board 4 by means of a pin or plug member 42. In using my invention in connection with a baler, the head boards are provided with a lateral bore adapted to receive the pin 42.

As regards the operation of my indicator, the following brief explanation is presented: As the material to be baled is fed into the machine and jammed into the compressing chamber, the head board 4 naturally recedes from the feeding chute and consequently exerts a pull on the cable 38. This pull on the cable is transmitted to the weight member 33 moving this member upwardly through the guide way. It will be apparent that if the length of the cable is adjusted properly slightly before the bale reaches the desired size, the trigger 36 will engage the lever 28 and on continued upward movement of the weight will spring the striker arm 12 in the manner previously described. The bell being sounded in this manner, the operator's attention is called to the fact that the bale is nearing completion and by keeping his eye on the upward movement of the trigger 36 as it passes the various indicating characters illustrated in Fig. 3, he can readily ascertain the exact moment at which the bale is finished. He may then throw the feeding mechanism out of gear and proceed to the placing of a new head board ready for the next bale. When the new head board is placed in the compressing chamber, the pin 42 is removed from the head board of the completed bale and inserted in the new head board. During the manipulation of the cable and pin, the weight 33 has fallen again to its initial position and the indicator is again ready for the formation of the next bale.

It will be apparent that the lever 23 may be used to reset the device after the alarm has been sounded by the described engagement of the trigger 36 with the lever 28, since, an upward movement of this lever is transmitted to the member 18 through the connecting rod 24 and serves to permit the trigger 16 to return to its normal position with respect to the member 15, under influence of the retractile spring 10 in its normal position.

It will, of course, be understood that the above description and accompanying drawings comprehend only the general and preferred embodiment of my invention and that various minor changes in the details of construction, proportion and arrangement of parts may be made within the scope of the appended claims and without sacrificing any of the advantages of my invention.

What is claimed is:

1. The combination with a baling press having the usual head board adapted for a step by step progress in the baling chamber, of an automatically operated bulk indicator and alarm signal attachment, said attachment including a vertically disposed standard provided with bulk indicating characters, a slidable trigger connected with said head board for registration with said characters, a plate secured to said standard, an alarm bell carried by said plate, a pivoted striking arm recessed to receive a trigger, a pivoted yoke, a trigger pivoted to said yoke for operation in said recess, means pivotally connected with said yoke for automatic engagement with said slidable trigger, and means further pivotally connected with said yoke for resetting said alarm after first said means have sounded the same.

2. The combination with a hay baler having the usual jam head board operable in the compressing chamber, of an automatically operated alarm signal and bulk indicator including a vertical standard, an indicator arm movable upon said standard in proportion to the movement of said head board in said compression chamber, a plate carried by said standard, oppositely disposed pivoted levers pivoted to said plate, one of said levers being positioned in the path of the indicator, pivoted connections between last said lever and said alarm means, and connections between the other of said levers and said alarm means whereby the latter may be manually reset after being sounded by first said lever.

3. The combination with a hay baling machine of the jam head compressing chamber type, of an automatically operated bulk indicator and alarm signal attachment, said attachment including a vertically disposed standard having a T shaped longitudinally extending slot and a plurality of bulk indicating characters on its front face, a weight member mounted for vertical sliding movement through said T shaped slot, an indicator trigger arm secured to the said weight member and disposed for sliding movement longitudinally of the character bearing face of the said standard, an alarm signal attached to the said vertical standard, an actuating arm for said signal disposed for engagement by the said indicator trigger arms at a predetermined point in the upward movement of the said indicator trigger arm, and means operatively connected at one terminal to the said weight member and detachably connected at the other terminal to the said jam head of the compressing chamber, said means being adapted to effect the movement of the said indicator trigger arm in a predetermined relation to the movement of the jam head board.

In testimony whereof I affix my signature in presence of two witnesses.

OLA A. RICHWINE.

Witnesses:
S. M. SMITH,
E. W. ALBERTY.

Copies of this patent may be obtained for five cents each, by addressing the "Commissioner of Patents, Washington, D. C."